US011954028B2

(12) United States Patent
Fielding et al.

(10) Patent No.: US 11,954,028 B2
(45) Date of Patent: Apr. 9, 2024

(54) ACCESSING ENCODED BLOCKS OF DATA

(71) Applicant: Arm Limited, Cambridge (GB)

(72) Inventors: Edvard Fielding, Trondheim (NO); Jian Wang, Lund (SE); Jakob Axel Fries, Lund (SE); Carmelo Giliberto, Trondheim (NO)

(73) Assignee: Arm Limited, Cambridge (GB)

( * ) Notice: Subject to any disclaimer, the term of this patent is extended or adjusted under 35 U.S.C. 154(b) by 79 days.

(21) Appl. No.: 17/657,498

(22) Filed: Mar. 31, 2022

(65) Prior Publication Data

US 2022/0318138 A1 Oct. 6, 2022

(30) Foreign Application Priority Data

Mar. 31, 2021 (GB) ...................................... 2104602

(51) Int. Cl.
*G06F 12/06* (2006.01)

(52) U.S. Cl.
CPC ...... *G06F 12/0646* (2013.01); *G06F 2212/40* (2013.01)

(58) Field of Classification Search
CPC ......................... G06F 12/0646; G06F 2212/40
USPC .......................................................... 711/200
See application file for complete search history.

(56) References Cited

U.S. PATENT DOCUMENTS 6,192,458 B1 * 2/2001 Arimilli .............. G06F 12/0864 711/119
8,542,939 B2 9/2013 Nystad et al.
8,635,428 B2 * 1/2014 Karlsson ............. G06F 12/1027 711/205
9,014,496 B2 4/2015 Nystad
2013/0036290 A1 2/2013 Nystad
2015/0058436 A1 * 2/2015 Kurita ................... G06F 3/0605 709/213
2021/0011646 A1 * 1/2021 Nystad ....................... G06T 1/60
2022/0100672 A1 * 3/2022 Apte ................... G06F 12/0824
2022/0100712 A1 * 3/2022 Nuttle ................. G06F 16/1805
2022/0214812 A1 * 7/2022 Alkalay ................ G06F 3/0679

FOREIGN PATENT DOCUMENTS

GB 2576506 A 2/2020

OTHER PUBLICATIONS

Combined Search and Examination Report dated Sep. 21, 2021, GB Patent Application No. GB2104602.4.
Examination Report and Corrected Search Report dated Apr. 19, 2022, GB Patent Application No. GB2104602.4.

* cited by examiner

*Primary Examiner* — Reginald G Bragdon
*Assistant Examiner* — Aaron D Ho
(74) *Attorney, Agent, or Firm* — Vierra Magen Marcus LLP

(57) ABSTRACT

There is disclosed a method of storing an encoded block of data in memory comprising encoding a block of data elements and determining a memory location (26) at which the encoded block of data is to be stored. The memory location (26) at which the encoded block of data is stored is then indicated in a header (406) for the encoded block of data by including in the header a memory address value (407) together with a modifier value (500) representing a modifier that is to be applied to the memory address value (407) when determining the memory location (26). When the encoded block of data is to be retrieved, the header (406) is read and processed to determine the memory location (26).

19 Claims, 7 Drawing Sheets

ACCESSING ENCODED BLOCKS OF DATA

CROSS-REFERENCE TO RELATED APPLICATIONS

This application claims priority pursuant to 35 U.S.C. 119(a) to United Kingdom Patent Application No. 2104602.4, filed Mar. 31, 2021, which application is incorporated herein by reference in its entirety.

BACKGROUND

The technology described herein relates to a method of and apparatus for storing an encoded block of data in memory. It also relates to the corresponding method of and apparatus for retrieving data for an encoded block of data from memory.

It is common in data processing systems to encode an array of data elements, such as an array of image data values (e.g. frames of video data or graphics data for display), so as to compress the data in order to reduce bandwidth and memory consumption. This is particularly desirable in data processing apparatus, e.g. of portable devices, where processing resources and power may be limited.

In order to encode an array of data elements, the array of data elements is often divided into smaller blocks (sub-regions) of data elements and encoded on a block by block basis. Encoded versions of the blocks of data can then be stored in memory. One example of an efficient, lossless encoding technique is described in U.S. Pat. No. 8,542,939 (Arm Limited). However, various other examples of encoding schemes exist that are suitable for encoding blocks of data.

When storing encoded blocks of data in memory, headers may be provided for the encoded blocks of data, with the headers indicating the locations of the encoded blocks of data in memory. When a particular encoded block is required for decoding, the associated header can then be read so as to determine the memory location of its encoded block, which encoded block can then be retrieved for decoding accordingly.

The Applicants believe that there remains scope for improvements to techniques for encoding arrays of data elements.

BRIEF DESCRIPTION OF THE DRAWINGS

Various embodiments of the technology described herein will now be described by way of example only and with reference to the accompanying drawings, in which.

DETAILED DESCRIPTION

Figure 1:
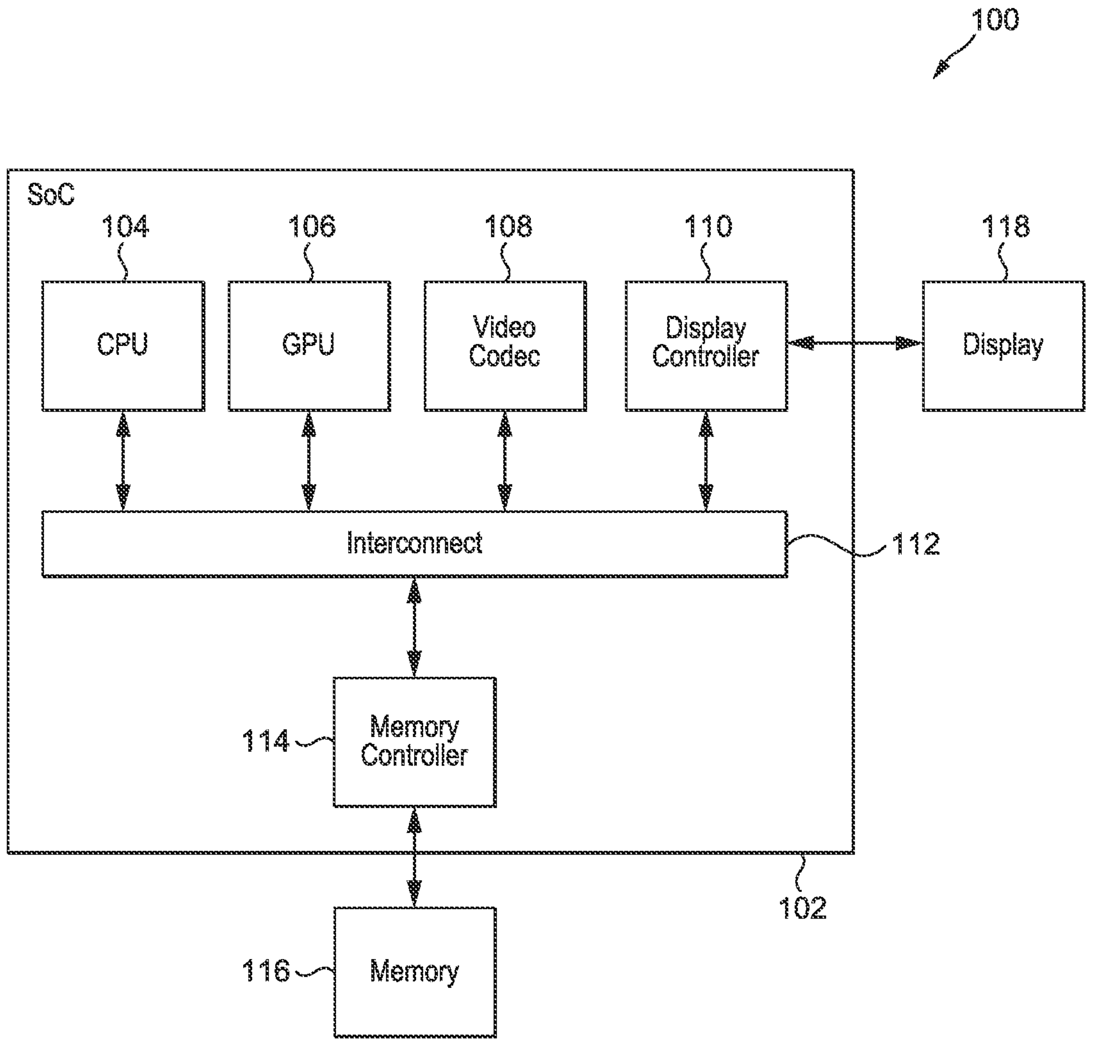
FIG. 1 shows schematically an array of data that may be encoded in accordance with embodiments of the technology described herein.

A first embodiment of the technology described herein comprises a method of storing an encoded block of data in memory, the method comprising:

- encoding a block of data elements of an array of data elements to generate an encoded block of data that represents the block of data elements;
- determining a memory location at which the encoded block of data is to be stored;
- generating a header for the encoded block of data that indicates the memory location at which the encoded block of data is stored, wherein the memory location is indicated by including in the header a memory address value together with a modifier value representing a modifier that is to be applied to the memory address value when determining the memory location; and
- writing out the header and the encoded block of data to memory, wherein the encoded block of data is stored in memory at the location indicated in the header for the encoded block of data.

A second embodiment of the technology described herein comprises an apparatus for storing encoded blocks of data in memory, the apparatus comprising:

- an encoding circuit configured to: encode a block of data elements of an array of data elements to generate an encoded block of data that represents the block of data elements;
- a header generating circuit configured to: determine a memory location at which the encoded block of data is to be stored; and generate a header for the encoded block of data, wherein the header indicates the memory location at which the encoded block of data is stored, wherein the memory location is indicated by the header generating circuit including in the header a memory address value together with a modifier value representing a modifier that is to be applied to the memory address value when determining the memory location; and
- a write out control circuit configured to write out the header and the encoded block of data to memory, wherein the encoded block of data is stored in memory at the location indicated in the header for the encoded block of data.

The technology described herein relates to techniques for encoding blocks of data of an array of data elements (which array of data elements may, e.g., comprise a frame, or a part of a frame).

When an encoded block of data is to be stored in memory, a header is provided for the encoded block of data, with the header indicating the location in memory where the encoded block of data is stored.

Correspondingly, when it is desired to subsequently retrieve an encoded block of data from memory, the associated header can thus be read in to first determine the memory location in which the encoded block of data is stored, with the data then being read in accordingly from the indicated memory location.

The header for an encoded block of data therefore indicates a location in memory that stores the encoded block of data. Subject to the particular requirements of the technology described herein, the indication may in general take any desired and suitable form, e.g. that may normally be included into the header for the purpose of indicating a memory location.

In particular, in the technology described herein the indication comprises a memory address value that can be used to determine the memory location where the encoded block of data is to be stored, e.g. as will be explained further below.

The memory address value itself may take any suitable and desired form. For example, the memory address value may itself be used to indicate a memory address. However, in embodiments, the memory address value is used to indicate a memory location in terms of a memory offset, e.g., from the start of a buffer, such as a buffer that stores encoded data for a plurality of encoded blocks of data. In that case the memory location can be determined using a pointer, e.g. to the start of the buffer, together with the offset.

The header for an encoded block of data normally has a fixed size and there are thus a fixed number of bits available for storing the memory address value (and this is in an embodiment also the case in the technology described herein). This means that, in more conventional header arrangements, the range of memory addresses that can be indicated in the header is strictly limited by the number of bits available for storing the memory address value.

The number of bits available for indicating the memory location may in general depend on the, e.g., data format, etc., but in a typical example the memory address value may be a 32-bit value. In some cases this is acceptable, and will provide a sufficiently large range of memory addresses.

However, because there is a limited range of memory addresses that can be indicated using the memory address value itself, this means that the encoding technique is therefore unable to support encoding of larger and/or higher resolution data structures (e.g. larger frame sizes, such as 64 k×64 k frames, which may increasingly be used in modern graphics processing applications) without, e.g., increasing the size of the headers, which may be undesirable.

Thus, in more conventional header arrangements, the (fixed) size of the memory address value field in the header introduces a limit on the range of memory locations in which encoded blocks of data can be stored, and hence restricts the size of data structure that can be encoded (thus there may be a maximum frame size that can be supported by the encoding technique, such that the encoding technique is not compatible with data structures larger than this frame size limit).

To address this, according to the technology described herein, a modifier value is included into the header together with the memory address value which modifier value represents a 'modifier' that is to be applied to the memory address (e.g. offset) value when determining the memory location. As will be explained further below, the modifier can thus be applied to the memory address value appropriately to modify, e.g., and in an embodiment, increase, the value that is represented by the memory address value itself, to thereby extend the memory address range that can be indicated by the header.

In this way a larger memory address range can be accessed, e.g., and in an embodiment, without having to increase the size of the header, or otherwise significantly modify the header structure. This in turn allows the encoding technique to support encoding of larger data structures. The technology described herein thus provides a relatively simple and cheap method for extending the encoding technique to larger data structures.

The modifiers of the technology described herein may comprise any suitable and desired modifiers that can be applied to the memory address values to extend the available memory address range. In an embodiment they comprise scale factors (e.g. multipliers). Thus, and in an embodiment, the modifier value represents a scale factor (multiplier) that is to be applied to the memory address values when determining the memory location.

That is, rather than the memory location simply being indicated in the header by the memory address value itself (whether that is in terms of an absolute memory address or a memory address offset), as may be the case in more conventional header arrangements, the memory location is instead represented in the header in terms of a memory address value together with a corresponding modifier, e.g., scale factor (multiplier), that can be applied to the memory address value to determine the memory location.

A modifier value is thus included into the header indicating which modifier is to be applied to the memory address value when determining the memory location.

When it is desired to retrieve an encoded block of data the header can thus be read in and the memory location then calculated by suitably applying the respective modifier indicated by the modifier value included into the header to the associated memory address value.

For example, in some embodiments, the memory address value comprises a memory offset, e.g. from the start of a buffer, e.g. which may be a header buffer that stores headers for a plurality of encoded blocks of data of the array of data elements.

In that case, the full memory location for storing the encoded block of data may normally (e.g. when not using a modifier of the technology described herein) be determined as:

memory location=header_pointer+offset where 'header_pointer' is a suitable pointer to the start of the, e.g., buffer from which the offset is defined.

In contrast, in the technology described herein, a modifier is in an embodiment applied to the offset. For example, in an embodiment the offset is multiplied by the modifier, e.g. such that the full memory location for storing the encoded block of data is instead determined as:

memory location=header_pointer+offset*modifier.

For example, where the modifier comprises a scale factor (e.g. a 1×, 16×, 64×, 256× multiplier), the memory location is determined by first multiplying the offset (the memory address value) by the relevant scale factor to determine a scaled offset, with the memory location then being determined using the scaled offset and the header pointer.

Similarly, where the memory location is defined in terms of the memory address value itself (rather than in terms of an offset), the memory location can be determined by multiplying the memory address value by the relevant scale factor to determine a scaled memory address.

Thus, in embodiments, the modifier value represents a scale factor (e.g. multiplier) that is to be applied to the memory address value to determine a scaled memory address value that can be used to determine the memory location.

Applying such modifiers, e.g. scale factors, may generally reduce the resolution at which memory address can be indicated (e.g. since when a 256× multiplier is applied, the memory addresses can only be indicated in steps of 256).

However, it will be appreciated that these steps are still relatively small compared to the overall memory address range that can be indicated (e.g. using a 30-bit memory address value), and so this can still provide sufficient resolution for storing the encoded blocks of data, particularly when the encoded blocks of data are stored in memory in a 'sparse' fashion, e.g. where the blocks of data are stored at pre-defined positions in a buffer of encoded data, e.g., and in an embodiment, at regularly-spaced intervals, as will be explained further below.

Other arrangements would of course also be possible and the modifier need not comprise a scale factor (e.g. multiplier) that is applied to the memory address value in the manner described above but may also comprise any other suitable modifier that can be applied to the memory address value in any suitable way, as desired, e.g. in order to extend the available memory address range. For example, rather than multiplying the memory address value by a suitable scale factor or multiplier, the modifier may instead comprise an addition or shift that is applied to the memory address value to extend the available memory address range.

In this way, by applying a suitable modifier to the memory address value within a header, the address range that can be indicated by the header can be extended beyond the range that would be possible to indicate using the memory address value by itself.

Furthermore, the extension of the memory address range provided by the technology described herein is in an embodiment achieved with minimal additional overhead or modifications to the existing header structure. For instance, in embodiments, there are a set of plural available modifiers and it is determined during the header generation which one of the available modifiers should be applied to the memory address value. This means that there is no need to store the actual modifier itself in the header and instead, and in an embodiment, the modifier value represents and encodes which one of the available modifiers is to be applied.

Thus, the modifier value included within a header represents a respective modifier (e.g. scale factor) from a set of plural available modifiers. Thus, in embodiments, the method comprises (the header-generating circuit) determining, from a plurality of available modifiers, which of the plurality of available modifiers should be used together with the memory address value for indicating the memory location at which the encoded block of data is to be stored, and including the modifier value representing the determined modifier in the header together with the memory address value.

The modifier (e.g. scale factor) that is to be applied can thus be encoded using a relatively small number of bits, e.g., and in an embodiment, two bits. Thus, in an embodiment, the modifier value comprises a 2-bit modifier value that is able to represent one of a set of four available modifiers. For example, in embodiments, the modifier value encodes one of a set of four different scale factors, such as 1×, 16×, 64× and 256× scale factors, that can be applied to appropriately scale the memory address value to extend the accessible memory range.

The encoding of the different modifiers (scale factors) may, for instance, be stored in a suitable look-up table so that the required modifier can be determined from the modifier value accordingly (e.g. with the modifier value '00' representing a 1× scale factor, the modifier value '01' representing a 16× scale factor, etc.).

The available modifiers may comprise any suitable and desired modifiers. In an embodiment they are scale factors (e.g. multipliers), as described above, but other modifiers could also be used.

In an embodiment one of the available modifiers is a 'zero' modifier, that when applied to a memory address value does not change the memory address value. For example, when the modifiers comprise scale factors or multipliers, one of the modifiers in an embodiment comprises a 1× multiplier.

As will be explained further below, this may facilitate a dynamic extension of the memory address range when storing a plurality of encoded blocks of data for an array of data elements, e.g. such that the memory address range can be extended as and when required. This also makes the approach of the technology described herein readily compatible with smaller data arrays (frames), e.g. where there is no need to extend the memory address range.

In particular, the modifier (e.g. scale factor) is in an embodiment used dynamically during the encoding process as encoded blocks of data are being stored in memory as and when it is required to extend the memory address range, e.g. as and when it is determined that the memory location for storing a particular (the next) encoded block of data would exceed the memory address range that could otherwise be accessed (e.g. based on the current modifier value).

For instance, whilst embodiments are described above in relation to storing a single encoded block of data, it will be appreciated that there may be a plurality of encoded blocks of data that are to be stored in memory, e.g., for a given array of data elements (e.g. a given frame). The plurality of encoded blocks of data may in that case be written out to sequential memory locations, e.g. such that the memory addresses monotonically increase when working through the array of data elements (e.g. frame). In embodiments, the modifier value is updated dynamically as new encoded blocks of data are being written to memory.

In particular, the modifier is in an embodiment initially set to be a 'zero' modifier (e.g. a 1× scale factor), and encoded blocks of data are written out to memory, with the memory locations being indicated in the header effectively by the memory address value alone (since the zero modifier does not change the memory address value). For each new encoded block of data that is to be written to storage, the full memory location is calculated, and when it is determined that the memory location will exceed the available memory address range based on the current modifier, the modifier can then be increased accordingly to extend the available memory address range.

Encoded blocks of data can then be written out to memory locations in the extended memory address range until the extended memory address range is exceeded, at which point the modifier can be increased again to further extend the memory address range, and so on.

Thus, in embodiments, when storing a plurality of encoded blocks of data in memory, which encoded blocks of data are to be written out in sequence to increasing memory locations, the modifier is in an embodiment initially set to a 'zero' modifier (such that the memory address value is not modified, e.g. a 1× scale factor), and the memory locations for the encoded blocks of data at the beginning of the sequence are thus initially indicated using the memory address value itself, without modification (e.g. as would normally be the case, e.g. when the technology described herein was not being used). As more encoded blocks of data are processed to be stored in memory, this will require larger memory addresses. Thus, when it is determined that the memory location for an encoded block of data would exceed the memory address range that can be indicated in the header using the memory address value with the current (e.g. zero) modifier applied, the modifier is increased to extend the available address range.

Thus, for each encoded block of data that is to be stored in memory, the memory location can first be calculated. When the memory location can be indicated using the memory address value with the current modifier (the memory location falls within the range of memory addresses that can be accessed using the current modifier), the memory address value is then set accordingly based on the current modifier. On the other hand, when the memory location cannot be indicated using the memory address value with the current modifier (the memory location falls outside the range of memory addresses that can be accessed using the current modifier), the modifier can then be increased, and the memory address value then set accordingly based on the increased modifier.

Thus, the modifier is in an embodiment progressively increased as the required memory address range increases as required as more blocks of the array are encoded/stored.

For example, in embodiments where the memory address value comprises an offset and the modifier comprises a scale factor, when storing a plurality of encoded blocks of data in memory, wherein the encoded blocks of data are stored in increasing memory locations, the encoding in an embodiment starts with a 1× scale factor and initially store the encoded blocks of data at memory locations within the available memory address range provided by the (unmodified) memory address value itself.

Once the calculated address for a memory location exceeds this range, the next (e.g. 16×) scale factor can then be applied to extend the available memory address range, and so on.

The modifier value may be included into the header separately from the memory address value, e.g. in a separate, dedicated field of the header data structure. That is, there may be a dedicated set of (e.g. two) bits that are always used for storing the modifier values.

However, in embodiments, a number of bits from the address value field itself are repurposed to store the modifier value. That is, a number of bits that would otherwise (when not performing the technology described herein) be used to indicate the memory address value itself are used to encode the modifier of the technology described herein.

In this respect the technology described herein recognises that in some cases there are some bits in the address value field that are expected to always be zero, and which can therefore be re-proposed accordingly for encoding the modifiers of the technology described herein.

This may particularly be the case where the encoding is performed in a 'sparse' manner such that the encoded blocks of data are stored in a buffer of encoded data at pre-defined positions, e.g. with a pre-defined order, e.g. which in an embodiment corresponds to the order in which the headers are stored in a header buffer. In that case each encoded block of data may be allocated a fixed amount of space in the buffer. For example, each encoded block of data may be allocated the same amount of space as would be required to store the uncompressed block of data. Each encoded block of data may therefore be allocated the same amount of space in the buffer, with there being a number of in an embodiment equally-spaced boundaries defining the memory locations for the respective encoded blocks of data. This then means that the memory location at which an encoded block of data need only be indicated in terms of its respective boundary, and the boundaries will have a fixed spacing in the buffer.

Thus, in embodiments, the encoded blocks of data are each allocated a fixed amount of space in the memory and are stored in the memory at pre-defined positions that are aligned with the respective boundaries for the allocated amounts of space (i.e. using a 'sparse' layout).

When the encoded blocks of data are stored using such a 'sparse' layout, where the memory locations at which the encoded blocks of data are stored are equally spaced in the buffer, this therefore means that a number of least significant bits of the memory address value will always be zero, e.g. as it is only necessary to indicate the position of respective boundary within the buffer, rather than a more precise memory location. In general, the number of least significant bits that are zero will depend on the size of the block of data, e.g. since larger blocks of data need to be allocated more space in the buffer, such that the steps between the memory location boundaries are larger.

This means that when the encoding is performed in a 'sparse' manner there are a number of bits that are effectively redundant (since they will always be zero) and these bits can therefore be re-purposed for storing the modifier values of the technology described herein. Thus, the memory address value can be, and in embodiments, is truncated, e.g. by removing a number of least significant bits. Truncating the memory address value in this way thus allows a corresponding number of bits to be used for storing the modifier value. For example, in an embodiment, the (e.g. two) least significant bits in the memory address value are truncated. The modifier value could then be stored using these least significant bits. In an embodiment, the memory address value is shifted towards the less significant bits by a corresponding number of bits that have been discarded, and the modifier value is stored in the most significant bits. Various other arrangements would be possible in this regard.

When the memory address value is truncated in this way it would be possible to re-insert the truncated least significant bits (i.e. the zeros) when determining the memory location when retrieving an encoded block of data. Thus, determining the memory location may involve modifying the memory address value (by re-inserting any lost bits) before applying the modifier. However, this is generally not necessary, as the memory location can suitably be encoded using the truncated memory address value and modifier.

Truncating the memory address values in this way means that there will be fewer bits available for storing the memory address (e.g. offset) value itself, which reduces the memory address range that can be indicated using the memory address value. However, this is compensated for by the much larger increase in memory address range afforded by the technology described herein.

Thus, the technology described herein provides a relatively simple and cheap approach for extending the header format of the headers generated in encoding techniques that use headers to indicate memory locations for storing encoded blocks of data to span larger memory address ranges, and hence to allow such encoding techniques to support larger data structures (e.g. frames).

This is done by including in the header together with the memory address value a suitable modifier value representing a modifier that is to be applied to the memory address value to determine the memory location, e.g. in the manner described above. When an encoded block of data is required to be retrieved from its memory location, the header can thus be read in appropriately and the memory location determined using the memory address value and the modifier. The encoded block of data can then be read in from its memory location and then decoded for use, e.g. in the normal way.

The technology described herein may therefore provide various improvements compared to other approaches.

The (original unencoded) array of data elements that is encoded by the encoding circuit can be any suitable data array. It may generally comprise a plurality of data elements (entries), each occupying different positions in the array. The data array may be an image (may represent an image). In various embodiments the data array is a frame of (image) (e.g. colour) data, e.g. for display, or a graphics texture. It would also be possible for the array of data elements to comprise an array of other graphics data, such as an array of depth data, or non-graphics data.

In an embodiment, the array of data elements is a frame that is generated by a graphics processing system, e.g. for display for an application, such as a game. Each array of data elements (frame) accordingly in an embodiment comprises an image to be displayed. The array of data elements is divided into a number of blocks that are encoded separately. Typically the array of data elements will be divided into a plurality of blocks for encoding.

The blocks that the overall data array is divided into for encoding purposes in these arrangements can take any suitable and desired form. Each block should comprise a sub-set of the data elements (positions) in the array, i.e. correspond to a particular region of the array.

The blocks may have any suitable and desired size. The blocks in an embodiment correspond to a block size that will otherwise be used in the data processing system in question. Thus, in the case of a tile-based graphics processing system, the blocks in an embodiment correspond to (have the same size and configuration as) the tiles that the rendering process of the graphics processing system operates on. However, the encoded blocks need not correspond to the tiles. For example, in embodiments the block size used for the encoding technique are smaller than the rendering tile size.

The data array element data values can take any suitable and desired form, and will depend upon the nature of the data array being encoded, e.g. whether it is a texture, an image, a frame, etc. In the case of a texture, for example, the data array element data values should be texture data (texel values). Such texture data could comprise, e.g., a set of colour values (Red, Green, Blue (RGB), a set of colour and transparency values (Red, Green, Blue, Alpha (RGBa)), a set of luminance and chrominance values, a set of shadow (light) map values, a set of a normal map (bump map) values, z values (depth values), stencil values, luminance values (luminance textures), luminance alpha textures, and/or gloss maps, etc.

In the case of an image or frame for display, the data array element data values should be pixel and/or sampling position data (data values). Such pixel data could comprise, e.g., appropriate colour (RGB) values, or luminance and chrominance values, etc.

The array of data elements may be generated in any suitable manner. The array of data elements may be generated by (and the data processing system may comprise) processing unit, which may comprise, for example, a graphics processing unit (GPU), a video processor/codec or video engine (video processing unit (VPU)), a digital camera image signal processor (ISP), an image processor, and/or a central processing unit (CPU), etc. There may be more than one processing unit, if desired. In an embodiment, the processing unit is a graphics processor or a video processor.

The processing unit should generate its array in an appropriate manner, e.g. by rendering the array in the case of a graphics processor, by appropriately decoding input encoded video data in the case of a video processor, from a captured image in the case of a digital camera image signal processor (ISP), etc.

Once generated, the array of data elements should be (and is in an embodiment) provided (sent) to the encoding circuit for encoding.

The encoding circuit may comprise any suitable such circuit that is operable to encode an array of data elements to as to produce an encoded version of the array of data elements, and may encode arrays of data elements in any suitable manner.

The encoding circuit is in an embodiment operable to encode arrays of data elements generated by the processing unit. Thus, the method in an embodiment comprises the encoding circuit encoding the array of data elements generated by the processing unit. The encoding circuit may encode only part of the overall data array (e.g. frame, image or texture) generated by the processing unit, but in an embodiment encodes the entire array (e.g. frame, image or texture) generated by the processing unit.

To facilitate this, the encoding circuit may (and in various embodiments does) form part of the processing unit, e.g. may be (integrated) encoding circuit of a graphics processing unit (GPU), a video processor/codec or video engine (video processing unit (VPU)), a digital camera image signal processor (ISP), an image processor, and/or a central processing unit (CPU), etc. Thus, in these embodiments, the processing unit both generates the array of data elements, and encodes the array (using its encoding circuit).

In various other embodiments, the encoding circuit may be separate to, e.g. may be a separate circuit (e.g. integrated circuit) to the processing unit, e.g. may comprise a "standalone" encoding unit, e.g. that is configured to receive (and encode) arrays of data elements from the processing circuit.

Once produced (encoded), the encoded array of data elements may be stored, e.g. in a buffer such as a frame buffer, in memory, from where it may then be read (e.g. by the decoding circuit). The memory where the encoded array may be stored may comprise any suitable memory and may be configured in any suitable and desired manner. For example, it may be a memory that is on chip with the encoding circuit, or it may be an external memory. In an embodiment it is in external memory, such as a main memory of the overall data processing system. It may be dedicated memory for this purpose, or it may be part of a memory that is used for other data as well.

The actual encoding of the blocks of data may be performed in any suitable and desired fashion.

In embodiments the encoding is performed according to the techniques described in U.S. Pat. No. 8,542,939 (Arm Limited).

For instance, in embodiments, the encoding circuit is operable to encode the array of data elements so as to produce an encoded version of the array of data elements by: dividing the array of data elements into plural separate blocks, generating a respective tree representation for representing each different block that the array of data elements is divided into, and generating data representing each tree representation so as to represent the array of data elements as an encoded version of the array of data elements.

However, other encoding techniques and representation (s) may be (and in various embodiments are) used.

As mentioned above, a header is provided for an (and each) encoded block of data. The header indicates the memory location for storing the encoded block of data. The header may also include any other suitable data that may desirably be stored for the encoded block of data, such as compression metadata, e.g. indicating a data size for the encoded block of data, or an indication of a compression scheme that has been used.

The header may be of any desired and suitable data size. The data size may be expressed in bits or bytes. For example, the header may comprise 32 bits or 4 bytes that indicate the location in memory for the encoded block of data. The header may also comprise 96 bits or 12 bytes (e.g. 6 bits for each one of 4×4 sub-blocks), e.g., that indicate the data size of the encoded block and/or sub-blocks of data. Thus, the header may, in total, be 128 bits or 16 bytes in size.

Once the header has been generated appropriately, the encoded block of data can then be (and is) written out the memory location indicated in the header for storage. Thus method thus in an embodiment further comprises writing out the header for the encoded block of data to memory and writing out the encoded block of data to memory, wherein the encoded block of data is stored in memory at the location indicated in the header for the encoded block of data. This is in an embodiment performed by suitable write control circuit of the encoder apparatus.

The headers may be stored in any desired and suitable way. For example, and in an embodiment, the headers are stored in a header buffer. In an embodiment the headers are stored at predictable locations in the header buffer, e.g. in a pre-determined order. Various arrangements would be possible in this regard.

Similarly, the encoded block of data may be stored in any desired and suitable way. In an embodiment, as mentioned above, the encoded block of data is stored using a 'sparse' layout. Thus, each encoded block of data may be allocated a fixed-size portion of a buffer, which fixed-size portions corresponds to the amount of space required to store the block of data in its original, unencoded format. This means that the encoded blocks of data will be aligned with respective boundaries within the buffer. This in turn means that there will be gaps in the buffer since the encoded blocks of data will typically not fill the allocated portion of the buffer. However, various other arrangements would be possible for storing the encoded blocks of data.

When an encoded block of data is subsequently required, e.g. for use, it can thus be retrieved from its memory location in memory. In particular this is done by first reading in the relevant header and then determining using the header the memory location in which the encoded block of data is stored.

Thus, although the technology described herein has been described above with particular reference to storing an encoded block of data, it will be appreciated that the technology described herein also extends to corresponding processes in which data for an encoded block of data is retrieved from memory and then decoded to derive a data value for a data element of the encoded block of data.

Thus, another embodiment of the technology described herein comprises a method of retrieving data for an encoded block of data from memory, the method comprising:

- reading in a header for an encoded block of data that represents a block of data elements of an array of data elements from memory, wherein the header includes a memory address value together with a modifier value representing a modifier that is to be applied to the memory address value when determining a memory location for the encoded block of data;
- determining a memory location for the encoded block of data by applying the modifier to the memory address value;
- reading in data for the encoded block of data from memory from the determined memory location; and
- decoding the encoded block of data to derive at least one data value for a data element of the encoded block of data.

Another embodiment of the technology described herein comprises a data processing apparatus for retrieving data for an encoded block of data from memory, the apparatus comprising:

- a read control circuit configured to:
  - read in a header for an encoded block of data that represents a block of data elements of an array of data elements from memory, wherein the header includes a memory address value together with a modifier value representing a modifier that is to be applied to the memory address value when determining a memory location for the encoded block of data;
  - determine a memory location for the encoded block of data by applying the modifier to the memory address value; and
  - read in data for the encoded block of data from memory from the determined memory location; and
- a decoding circuit configured to:
  - decode the encoded block of data to derive at least one data value for a data element of the encoded block of data.

As will be appreciated, these embodiments in which data for an encoded block of data is retrieved from memory can, and in some embodiments do, include any one or more or all of the optional features of the technology described herein as described herein in any embodiment, as appropriate.

Thus, for example, embodiments may comprise (e.g. the apparatus or system) both storing an encoded block of data in the manner of the technology described herein as described herein in any embodiment, and retrieving data for an encoded block of data in the manner of the technology described herein as described herein in any embodiment.

Similarly, the (original and/or encoded and/or decoded) data values, data elements, blocks of data elements, array of data elements, headers, regions etc., may take any desired and suitable form or format, for example as described herein in any embodiment.

In embodiments in which a header is read in from memory for the encoded block of data, reading in the header for the encoded block of data from memory may be performed in any desired and suitable way.

Reading in data for the encoded block of data from memory may also be performed in any desired and suitable way.

In embodiments in which respective distinct regions of memory locations are allocated to respective sets of adjacent blocks of data elements, the distinct region of memory locations may be accessed in any desired and suitable way. In embodiments, the distinct region of memory locations may be accessed using a memory address or memory offset for the distinct region of memory locations in question. As discussed above, the relevant memory address or memory offset may be indicated in a header for the encoded block of data.

In any of the above embodiments, the decoding scheme that is used to derive the data value for the data element of the encoded block of data can take any desired and suitable form, e.g. that corresponds to the encoding scheme. A decoding operation that may be used in an embodiment is described in more detail in U.S. Pat. No. 8,542,939 (Arm Limited), which is incorporated herein by reference.

The decoding circuit is thus in an embodiment operable to decode arrays of data in the manner described in U.S. Pat. No. 8,542,939 (Arm Limited). Thus, the method may comprise decoding at least part of the encoded version of the array of data elements by using data representing a representation that represents some or all of the data elements of the data array to determine a value to be used for each data element of some or all of the data elements of the data array.

The decoding circuit may comprise any suitable such circuit or circuitry that is operable to decode encoded versions of arrays of data elements, and may decode encoded versions of arrays of data elements in any suitable manner.

The decoding circuit is in an embodiment operable to decode arrays of data elements encoded by the encoding circuit. To do this, the decoding circuit in an embodiment receives at least part of the encoded version of the array of data elements, e.g. by reading the encoded array from the memory in which the encoded array is stored.

The decoded version of the array of data elements that is produced by the decoding circuit should (and in an embodiment does) comprise a decoded version of at least part of, and in an embodiment all of, the array of data elements produced by the processing unit.

In various other embodiments, the encoding circuit may be separate to, e.g. a separate circuit (e.g. integrated circuit) to the processing circuit that uses the (decoded) data values, e.g. may comprise a "standalone" decoding unit, which may be configured to decode and provide (send) arrays of data elements to the processing circuit that uses the data values.

As will be appreciated, any of the above described retrieving processes that are performed in respect of a header and/or an encoded block and/or sub-block and/or tile of blocks of data elements and/or set of blocks of data elements may, in practice, be performed respectively for each (e.g. every) one of plural headers and/or encoded blocks and/or sub-blocks and/or tiles of blocks and/or sets of blocks for an array of data elements.

Similarly, as will be appreciated, any of the above described decoding processes that are performed in respect of a data value or data element of an encoded block and/or sub-block may, in practice, be performed respectively for each (e.g. every) one of plural data values or data elements of the encoded block and/or sub-block.

In any of the above embodiments, once determined, a (decoded) data value for a data element of an encoded block may be used in any desired and suitable way.

The data value may be used, for example, for further processing by processing circuit (e.g. a graphics processor) that processes arrays of data elements in blocks, e.g. rather than lines.

The data value may be used (e.g. by (e.g. a texture mapper of) a graphics processor) when deriving a further data value. In these embodiments, the array of data elements may correspond to a graphics texture and the data value may correspond to a texel or texels.

The data value may also or instead be used, for example, for further processing by a processing circuit (e.g. an output (e.g. display) processor) that processes arrays of data elements in lines, e.g. rather than blocks.

The data value (or further data value) may be outputted (e.g. by an output (e.g. display) processor), e.g. for display. In these embodiments, the array of data elements may correspond to a frame of graphics data and the data value may correspond to a pixel or pixels. In these embodiments, the data value may form part of an output array of data elements. The output array of data elements may be a rotated output relative to the (encoded) stored array of data elements.

The technology described herein, at least in its embodiments, may therefore provide various improvements compared to existing approaches for storing (and retrieving) encoded blocks of data from memory.

In an embodiment, the operation in the manner of the technology described herein can be selectively activated. However, in embodiments, the operation of the technology described herein is always activated. As explained above, the approach of the technology described herein is readily compatible with data arrays of any size, e.g. as the modifier that is applied may comprise a 'zero' modifier (e.g. a 1× scale factor) in which case the addressing can be performed as normal.

As well as the particular units and components required for operation in the manner of the technology described herein, the data processing system may, and in an embodiment does, also comprise one or more of, and in an embodiment all of, any other suitable and desired component, unit, processor, etc., that a data processing system may comprise. Thus the data processing system may comprise one or more of, and in an embodiment all of: a central processing unit, a host processor (or host processors), a graphics processing unit, a video processor, an image signal processor, a camera, a system bus, and a memory controller. In an embodiment, the data processing system comprises and/or is in communication with, one or more memories and/or memory devices that store data described herein, and/or software for performing the processes described herein.

The methods and apparatus of the technology described herein can be implemented in any appropriate manner, e.g. in hardware or software, and in (and be included in) any appropriate device or component.

The actual device or component which is used to store the data in the manner of the technology described herein will, for example, depend upon the nature of the data array that is being stored. Thus, for example, in the case of a graphics texture, an appropriate processor, such as a personal computer, may be used to generate and store the textures in the manner of the technology described herein, e.g. by an application developer, and the so stored textures then provided as part of the content of a game, for example. In the case of the stored data array being a frame for display, then it may accordingly be a graphics processor that generates and stores the data in the manner required.

Similarly, on the data reading (decoding) side of the operation, in the case of texture data, for example, it could be a graphics processor that reads (decodes) the stored data array, and in the case of a frame for display, it could be a display controller for a display that reads (decodes) the stored data array.

In an embodiment the technology described herein is implemented in a graphics processor, a display controller, an image signal processor, a video decoder or a video encoder, and thus the technology described herein also extends to a graphics processor, a display controller, an image signal processor, a video decoder or a video encoder configured to use the methods of the technology described herein, or that includes the apparatus of the technology described herein, or that is operated in accordance with the method of any one or more of the embodiments of the technology described herein. Subject to any hardware necessary to carry out the specific functions discussed above, such a graphics processor, display controller, image signal processor, video decoder or video encoder can otherwise include any one or more or all of the usual functional units, etc., that graphics processors, display controllers, image signal processors, video decoders or video encoders include. In an embodiment, the methods and apparatus of the technology described herein are implemented in hardware, in an embodiment on a single semiconductor platform.

The technology described herein may be particularly, but not exclusively, suitable for use in low power and portable devices. Thus, in an embodiment, the technology described herein is implemented in a portable device, such as a mobile telephone or PDA.

Similarly, the memory where the data representing the encoded blocks of data in the data array is stored may comprise any suitable such memory and may be configured in any suitable and desired manner. For example, it may be an on chip buffer or it may be an external memory (and, indeed, may be more likely to be an external memory). Similarly, it may be dedicated memory for this purpose or it may be part of a memory that is used for other data as well. In an embodiment, this data is stored in main memory of the system that incorporates the graphics processor.

In the case of a texture data array, the memory is in an embodiment a texture buffer of the graphics processing system (which buffer may, e.g., be on chip, or in external memory, as desired). Similarly, in the case of a frame for the display, the memory is in an embodiment a frame buffer for the graphics processing system and/or for the display that the graphics processing system's output is to be provided to.

Other memory arrangements would, of course, be possible.

The technology described herein can be implemented in any suitable system, such as a suitably configured microprocessor based system. In an embodiment, the technology described herein is implemented in computer and/or microprocessor based system.

The various functions of the technology described herein can be carried out in any desired and suitable manner. For example, the functions of the technology described herein can be implemented in hardware or software, as desired. Thus, for example, the various functional elements of the technology described herein may comprise a suitable processor or processors, controller or controllers, functional units, circuits/circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

Furthermore, any one or more or all of the processing stages and engines of the technology described herein may be embodied as processing stage circuitry (circuits), e.g., in the form of one or more fixed-function units (hardware) (processing circuitry (circuits)), and/or in the form of programmable processing circuitry (circuits) that can be programmed to perform the desired operation. Equally, any one or more of the processing stages and processing stage circuitry of the technology described herein may be provided as a separate circuit element to any one or more of the other processing stages or processing stage circuitry (circuits), and/or any one or more or all of the processing stages and processing stage circuitry (circuits) may be at least partially formed of shared processing circuits/circuitry.

It will also be appreciated by those skilled in the art that all of the described embodiments of the technology described herein can include, as appropriate, any one or more or all of the optional features of the technology described herein.

The methods in accordance with the technology described herein may be implemented at least partially using software e.g. computer programs. It will thus be seen that embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a data, e.g. graphics, processor, renderer or other system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk.

It will further be appreciated that not all steps of the methods of the technology described herein need be carried out by computer software and thus further broad embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

Various embodiments of the technology described herein will now be described by way of example only and with reference to the accompanying drawings.

The drawings show elements of a data processing apparatus and system that are relevant to embodiments of the technology described herein. As will be appreciated by those skilled in the art there may be other elements of the data processing apparatus and system that are not illustrated in the drawings. It should also be noted here that the drawings are only schematic, and that, for example, in practice the shown elements may share significant hardware circuits, even though they are shown schematically as separate elements in the drawings.

As is discussed above, embodiments of the technology described herein relate to arrangements that comprise storing encoded blocks of data in memory. Headers are generated for the encoded blocks of data.

Various embodiments of the technology described herein will now be described in the context of the processing of graphics data for display. However, the concepts described herein can equally be applied to contexts in which arrays of other types of data are accessed.

FIG. 1 shows schematically an embodiment of a data processing system 100 that can store encoded arrays of data elements and retrieve data for encoded arrays of data elements in the manner of the technology described herein.

In this embodiment, the system 100 comprises a data processing apparatus in the form of a system on chip (SoC) 102. The system 100 also comprises off-chip (main) memory 116 and a display device 118.

The SoC 102 comprises a central processing unit (CPU) 104, a graphics processing unit (GPU) 106, a video codec 108, a display controller 110, an interconnect 112 and a memory controller 114.

As is shown in FIG. 1, the CPU 104, GPU 106, video codec 108, and display controller 110 communicate with each other via the interconnect 112 and with the memory 116 via the interconnect 112 and memory controller 114. The display controller 110 also communicates with the display device 118.

In the following embodiments, the GPU 106 generates and stores encoded graphics data. The encoded graphics data is then read, decoded and output, e.g. by the display device 118 for display. In other embodiments, the video codec 108 may encode graphics data and then store the encoded graphics data and/or may read encoded graphics data and then decode the encoded graphics data.

Figure 2:
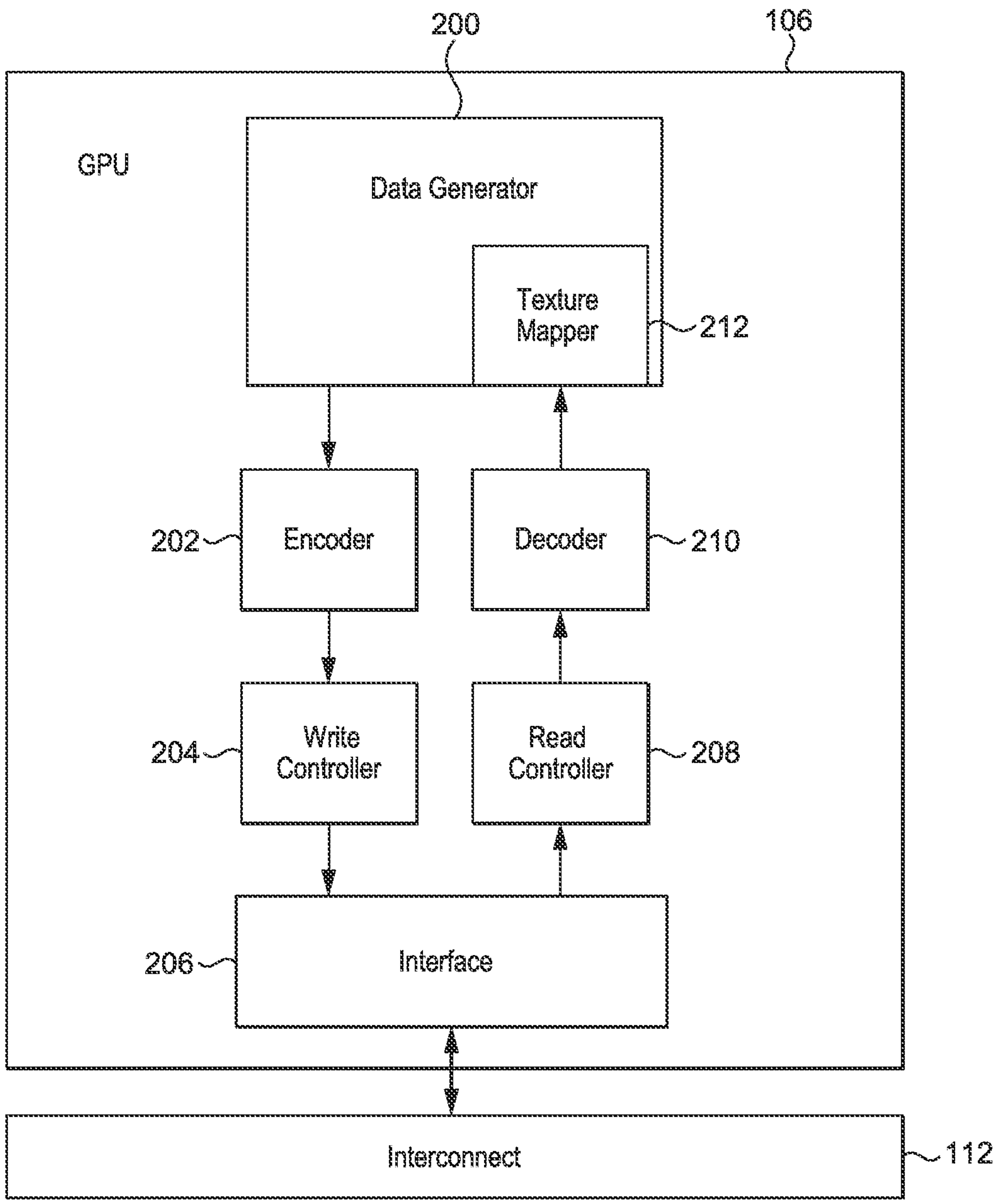
FIG. 2 shows schematically a graphics processor according to an embodiment of the technology described herein.

FIG. 2 shows further details of the GPU 106. In this embodiment, the GPU 106 comprises a data generator 200 that generates frames of graphics data. In this embodiment, the data generator 200 generates graphics data using a graphics processing pipeline.

The GPU 106 also comprises an encoder 202 that encodes the graphics data. In doing this, the encoder 202 divides the frame of graphics data into a plurality of similarly shaped non-overlapping blocks and then encodes each of those blocks separately. The encoded blocks of graphics data are then written out to memory 116 by a write controller 204 via an interface 206. The process of generating and storing an encoded block of data is described in more detail below.

The GPU 106 also comprises a read controller 208 that can read in, via the interface 206, data for a block of an encoded texture from memory 116. The encoded data for the block is then decoded by a decoder 210 before being used by a texture mapper 212 of the data generator 200. The process of retrieving and decoding data for an encoded block of data is described in more detail below.

The graphics processing pipeline and rendering process will now be described in more detail with reference to FIG. 3.

Figure 3:
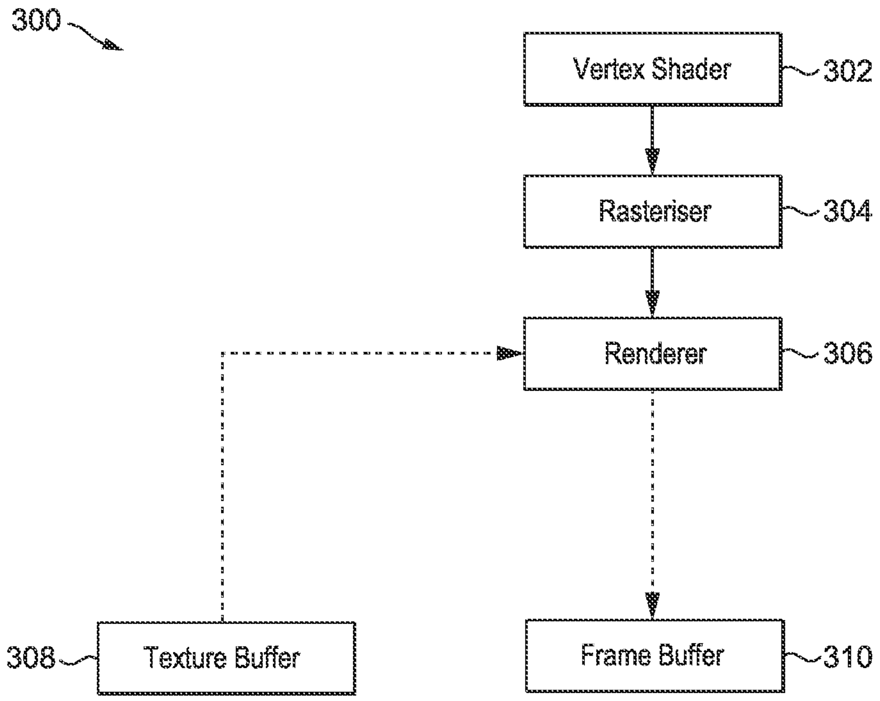
FIG. 3 shows a graphics processing pipeline that can be used in embodiments of the technology described herein.

As is shown in FIG. 3, the pipeline 300 comprises a sequence of different stages, with each stage performing a different operation on "primitives" (e.g. polygons) making up the surfaces of the features of the frame to prepare them for output.

First in the pipeline 300 is a vertex shader 302 which vertex shades the vertices of the primitives for the output being generated. The vertex shader 302 takes input data values associated with the vertices, etc., defined for the output to be generated, and processes those data values to generate a set of vertex shaded attribute data values for use by subsequent stages of the graphics processing pipeline 300.

The rasteriser 304 then operates to rasterise the primitives making up the render output into individual graphics fragments for processing. To do this, the rasteriser 304 receives the graphics primitives for rendering, rasterises the primitives to sampling points and generates graphics fragments representing appropriate sampling positions for rendering the primitives. The fragments generated by the rasteriser 304 are then sent onwards to the rest of the pipeline 300 for processing.

The graphics fragments generated by the rasteriser 304 are then passed to the renderer 306 for shading. The output of the renderer 306 is a set of appropriately shaded, e.g. colour, values for sampling positions for the frame. The output of the renderer 306 is then stored in a frame buffer 310 of the memory 116.

The renderer 306 includes a number of different processing units, such as a fragment shader, blender, texture mapper 212, etc. In particular, as shown in FIG. 3, the renderer 306 will, inter alia, access encoded textures stored in a texture buffer 308 that is accessible to the GPU 106, so as to be able to apply the relevant texture to fragments that it is rendering. The memory where the texture buffer 308 resides may be on chip or in external memory (e.g. memory 116) that is accessible to the GPU 106.

The GPU 106 uses the retrieval process of the embodiments described herein in respect of the stored encoded textures in the texture buffer 308. Thus, when the renderer 306 needs to access a texture value, the texture buffer 308 will be read by the read controller 208 in the manner described herein.

The GPU 106 also uses the storage process of the embodiments described herein in respect of encoded output data to be stored in the frame buffer 310. Thus, when the generated output data from the GPU 106 is written out to the frame buffer 310, that data is encoded by the encoder 202 and then written to the frame buffer 310 by the write controller 204 in the manner described herein.

This encoded output data can then be read from the frame buffer 310 in the manner described herein and decoded, e.g., by the display controller 110 for the display device 118 on which the frame is to be displayed. Thus, in this embodiment, the display controller 110 comprises a read controller and decoder similar to those of the GPU 106. In other embodiments, the video codec 108 may comprise a read controller and decoder and/or write controller and encoder similar to those of the GPU 106.

Other arrangements for the data processing system 100 would, of course, be possible. For example, the rendering that is performed may comprise ray tracing, hybrid ray tracing, or any other suitable rendering techniques, as desired, in which case the processing (rendering) of the sets of geometry may be performed accordingly.

A process of encoding and storing a block of data elements of an array of data elements, such as a texture or frame of graphics data, will now be described in more detail with reference to FIGS. 4-7.

Figure 4A:
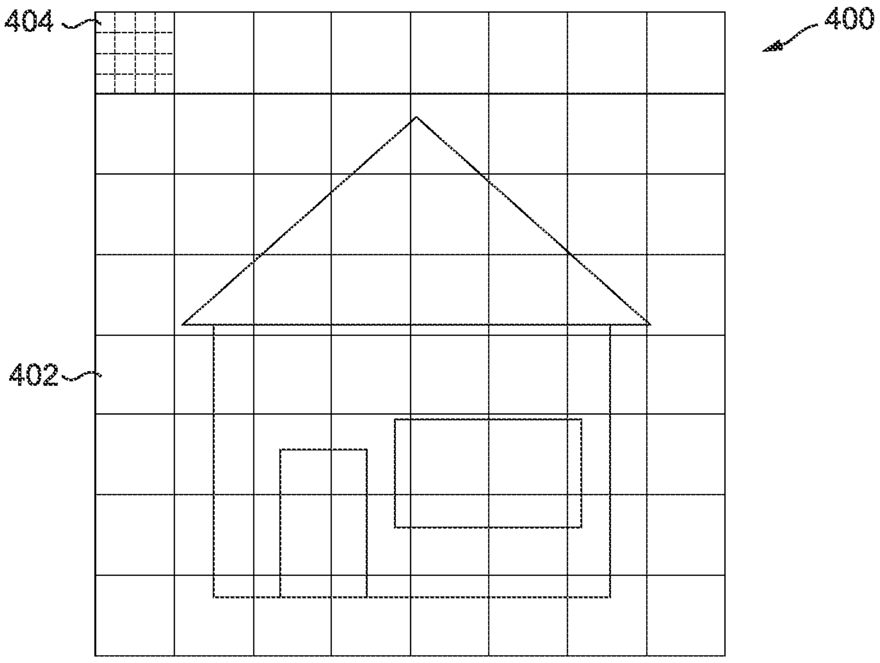
FIG. 4A shows an array of data elements to be encoded according to an embodiment of the technology described herein.

FIG. 4A shows an array of data elements 400 to be encoded and stored. In this embodiment, the array of data elements 400 is part of a frame of graphics data and is 128×128 data elements in size. In this embodiment, each data element has an RGBX8 format. Thus, each data element comprises an 8-bit red (R) data value, an 8-bit green (G) data value, an 8-bit blue (B) data value and an 8-bit transparency (α) data value, giving 32 bits in total per data element. Other array sizes and data element formats could of course be used as desired.

As is shown in FIG. 4A, the array of data elements 400 is divided into 64 (i.e. 8×8) blocks 402 for encoding purposes. In this embodiment, each block 402 is 16×16 data elements in size. In these embodiments, the size of each block is therefore 1024 bytes (i.e. 16×16×32/8). These square-shaped block embodiments can be particularly efficient, for example, when the array of data elements may be rotated (e.g. for display) and/or may be used for further processing by processing circuitry (e.g. a graphics processor) that generally processes arrays of data elements in blocks rather than lines.

Other block sizes could of course be used as desired, such as blocks of data elements which are 32×8 data elements in size. These oblong-shaped block embodiments can be more efficient, for example, when the array of data elements may not be rotated (e.g. for display) and/or may be used for further processing by processing circuitry (e.g. an output (e.g. display) processor) that generally processes arrays of data elements in lines rather than blocks, whilst still being efficient if the array of data elements happens to be rotated and/or processed by processing circuitry (e.g. a graphics processor) that generally processes arrays of data elements in blocks rather than lines.

As is also shown in FIG. 4A, the blocks of data elements are further divided into 16 (i.e. 4×4) sub-blocks 404 for encoding purposes. In this embodiment, each sub-block 404 is 4×4 data elements in size. In these embodiments, the size of each sub-block is therefore 64 bytes (i.e. 4×4×32/8). Again, other sub-block sizes could be used as desired.

In this embodiment, the encoding scheme that is used to encode the blocks 402 of the array 400 is a lossless entropy encoding scheme that comprises, inter alia, determining, for each type of data value represented by the data elements of the block 402 (i.e. for each of R, G, B and α), a lowest data value and a set of differences for each data element and sub-block 404 of the block 402. The encoded version of the block 402 therefore comprises a lowest data value and a set of differences for each data element and sub-block 404 of the block 402.

In this embodiment, the data size of the encoded version of the block is not fixed and is based on the particular data values of the block. For example, a block 402 of substantially uniform colour will compress to an encoded block that is smaller in data size than a block 402 of more highly varied colour.

Further details of a suitable encoding scheme can be found, for example, in U.S. Pat. No. 8,542,939 (Arm Limited) or U.S. Pat. No. 9,014,496 (Arm Limited), the entire contents of which are incorporated herein by reference. Other encoding schemes could of course be used as desired.

As will be appreciated, the encoding process is repeated for each block 402 that is to be encoded.

Figure 4B:
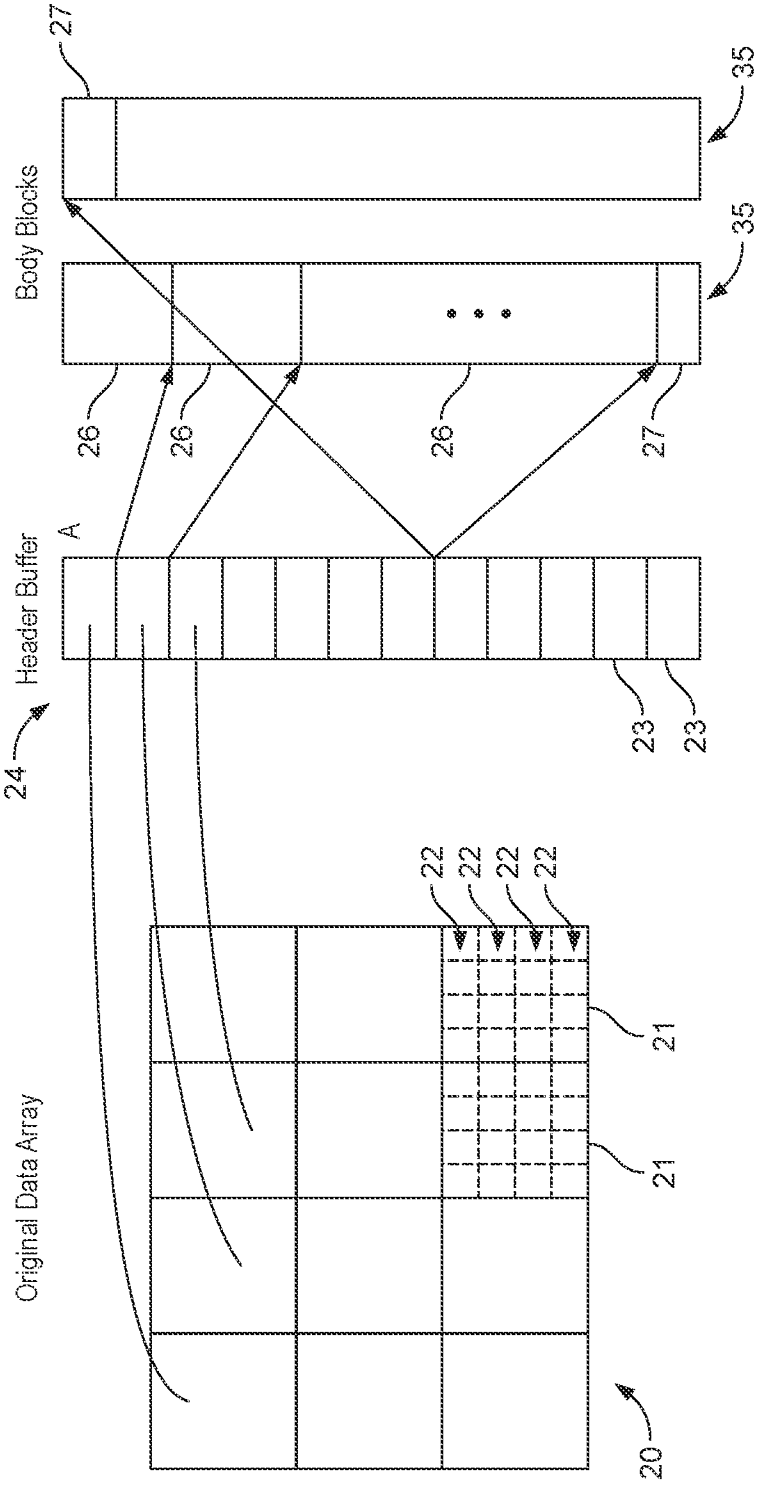
FIG. 4B shows schematically the storing of an array of data in an embodiment.

FIG. 4B shows schematically an embodiment for storing the data that is generated to represent the data array in some embodiments of the technology described herein in memory.

FIG. 4B again shows schematically an array of original data 20 that is a two-dimensional data array containing a plurality of data elements (containing data entries at a plurality of particular positions within the array) and that is to be encoded and compressed and stored. As discussed above, the data array 20 could be any suitable and desired array of data, but in a graphics processing context, it could, for example, be a texture map (i.e. an array of texture elements (texels)), or an array of data representing a frame to be displayed (in which case the data array may be an array of pixels to be displayed). In the case of a texture map, each data entry (position) in the data array will represent an appropriate texel value (e.g. a set of colour values, such as RGBa, or luminance and chrominance, values for the texel). In the case of a frame for display, each data entry (position) in the array will indicate a set of colour values (e.g. RBG values) to be used for displaying the frame on a display.

As shown in FIG. 4B, to store the data array 20 in memory, the data array 20 is first divided into a plurality of non-overlapping, equal-size and uniform blocks 21, each block corresponding to a particular region of the data array 20. As discussed above, in the present embodiment, each block 21 of the data array corresponds to a block of 16×16 elements (positions) within the data array 20 (i.e. a block of 16×16 texels in the case of a texture map). (Again, other arrangements would, of course, be possible.)

Each block 21 that the data array 20 is divided into is further sub-divided into a set of sixteen non-overlapping, uniform and equal-size sub-blocks 22. In the present case, as each block 21 corresponds to 16×16 elements (positions) within the data array, each sub-block 22 accordingly corresponds to a 4×4 data element region within the block 21 (e.g. 4×4 texels in the case of a texture map). (FIG. 4B only shows the division of a few of the blocks 21 of the data array 20 into sub-blocks for simplicity. However, each and every block 21 that the original data array 20 is divided into is correspondingly sub-divided into a set of plural sub-blocks 22.)

To store the data array 20 in memory, firstly a header data block 23 is stored for each block 21 that the data array 20 has been divided into. These header data blocks are stored in a header buffer 24 in memory. The header buffer 24 starts at a start address A in memory, and the header data blocks 23 are each stored at a predictable memory address within the header buffer 24.

FIG. 4B shows the positions of the header data blocks 23 in the header buffer 24 for some of the blocks 21 that the data array 20 is divided into. Each block 21 that the data array 20 is divided into has a corresponding header data block 23 in the header buffer 24. The position that each header data block 23 is stored at within the header buffer 24 is determined from (predicted from) the position within the data array of the block 21 that the header data block 23 relates to.

In the present embodiment, each header data block 23 in the header buffer 24 has the same, fixed size, corresponding to the burst-size used by the data processing system in which the stored data array is to be used. This means that the header data blocks 23 are of a size that can be fetched using a system-friendly burst size.

As well as storing a respective header data block 23 in the header buffer 24 for each block 21 that the original data 20 is divided into, the data storage arrangement of the present embodiment also stores data for each sub-block 22 that a given data block is divided into. This sub-block data is stored in memory in sub-block storage body blocks 35, which comprise in the present embodiment aligned blocks of 1024 bytes. (Having the body blocks storing the sub-block data in 1024 byte sub-block storage blocks provides the ability to encode the data array with several different encoders in parallel, by each encoder allocating a new block through a central repository every time it runs out of space.) In the present embodiment, the body blocks 35 are stored directly after the header buffer 24 (but may appear in random order there). This allows the pointer data in the header data blocks to be in the form of offsets from the end of the header buffer 24. (This is not essential, and the body blocks 35 may reside anywhere in memory, if desired)

The sets of data 26 for each respective set of sub-blocks are stored in the body blocks one after another, as shown in FIG. 4B. This has the effect then that the data for a set of sub-blocks 22 for a given 16×16 block 21 can span two different body blocks 35 (as shown in FIG. 4B for the set 27 of sub-block data).

Figure 4C:
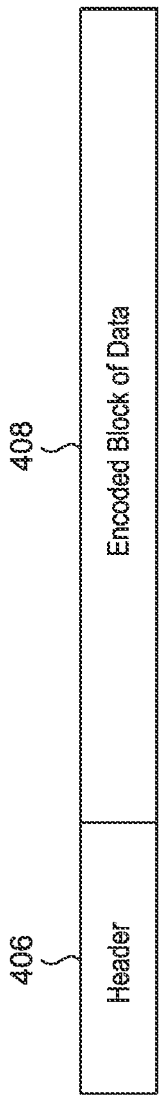
FIG. 4C shows a data structure comprising a header and corresponding encoded block of data.

FIG. 4C shows a header 406 and encoded block of data 408. In this example, the header 406 will be stored in a "header buffer" of the memory 116 and the encoded block of data 408 will be stored in a "body buffer" of the memory 116. The header buffer and body buffer may, for example, form part of the frame buffer or texture buffer.

Figure 5A:
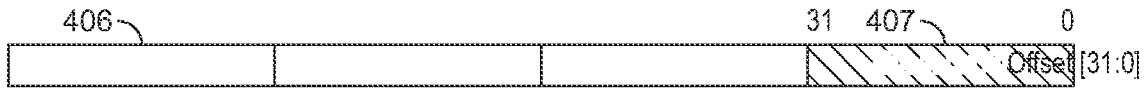
FIG. 5A shows a header data structure in more detail and FIG. 5B shows a header data structure according to an embodiment of the technology described herein.

In this example, as shown in FIG. 5A, the header 406 comprises a 32-bit memory address value field 407 that is used to store an offset from the start of the header buffer to the corresponding encoded block of data in the body buffer. This offset allows the encoded block of data to be located in memory. The header 406 also contains a number of other fields but these are not relevant to the discussion of the present embodiment (and so will not be described here).

In this example, the memory location where the encoded block of data is stored (the payload address) is thus calculated as:

payload_address=header_pointer+offset.

It will be appreciated that the size of the offset value (32 bits in this example) thus restricts the memory address range that can be indicated in the header. This means that the encoding technique described above may be unable to support larger frame sizes, and there is a frame size limit to which the encoding technique can be applied. The frame size limit may in general depend on the data format.

The present embodiment thus modifies the header to include a scale factor that can be applied to the offset in order to extend the accessible memory address range, as will be explained further below.

Figure 5B:
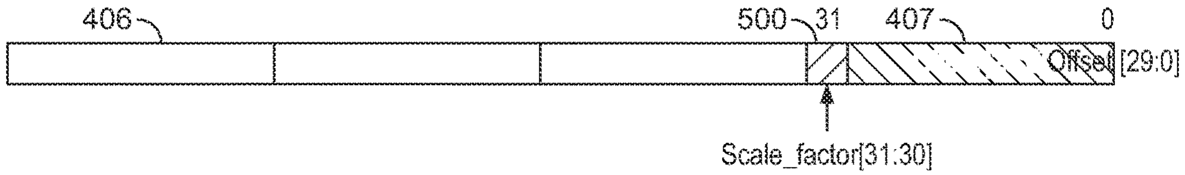

FIG. 5B thus shows a modified header 506 for an encoded block of data according to an embodiment of the technology described herein. In this embodiment, a set of (in this example the two most significant bits) bits from the 32-bit offset field 407 are re-purposed for storing an indication of the scale factor 500 that is to be applied.

The scale factor 500 is a 2-bit encoding of a set of scale factors: 1×, 16×, 64× and 256×, which can be encoded using respective modifier values 00, 01, 10 and 11. The payload address can thus be calculated using the scale factor as:

payload_address=header_pointer+offset*scale factor.

The scale factor is then used dynamically per block in a frame. Thus, the scale factor is initially set to 1× (modifier value '00') at the start of the block and is only increased when the calculated offset exceeds the available address range.

This approach also means that the new header format according to FIG. 5B is backwards compatible with smaller frames, since in that case the 1× scale factor is sufficient.

Figure 6:
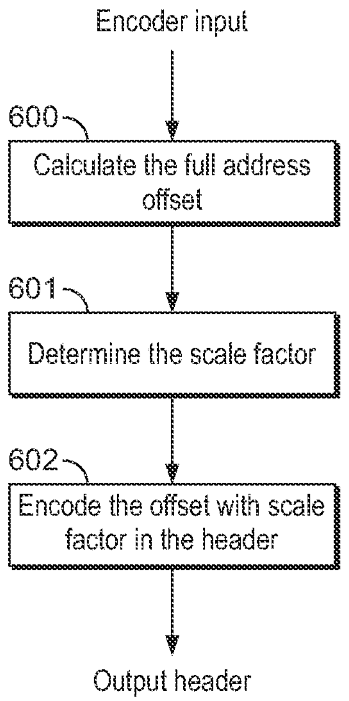
FIG. 6 is a flow chart illustrating a header generating technique according to an embodiment of the technology described herein.

FIG. 6 shows the overall header generating flow according to an embodiment of the technology described herein.

For an encoded block of data that is to be stored in memory, the full address offset is first calculated (step 600). Based on the full address offset, the appropriate scale factor is then determined (step 601).

The full address offset is then encoded using the scale factor into the header, with the encoded offset 407 and scale factor 500 being included appropriately into the header (step 602). The header can then be written out to the header buffer and the encoded block of data written out to the indicated memory location.

Figure 7:
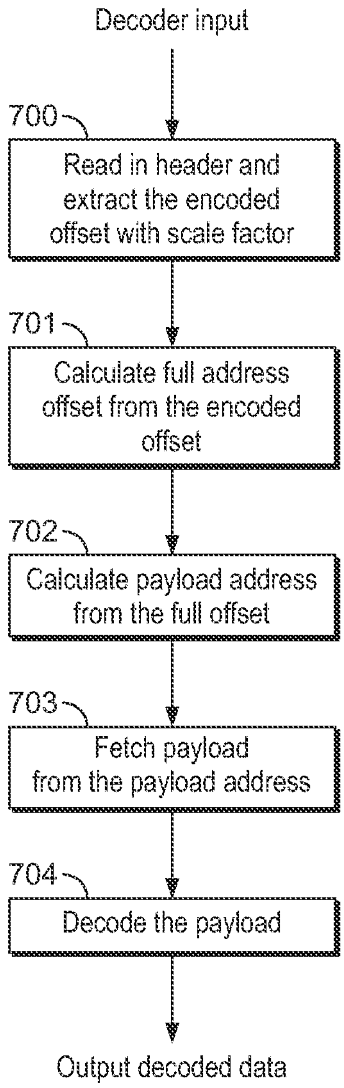
FIG. 7 is a flow chart illustrating a decoding technique according to an embodiment of the technology described herein.

When the encoded block of data is subsequently required, it is then retrieved from its memory location, and decoded, etc., for use. FIG. 7 shows the corresponding overall decoding flow according to an embodiment of the technology described herein.

For an encoded block of data that is required, the decoding circuit first reads in the associated header and extracts the encoded offset 407 and associated scale factor 500 (step 700). The full address offset is then calculated accordingly from the encoded offset by applying the indicated scale factor (step 701). The payload address can then be determined appropriately from the full address offset (step 702).

Once the payload address is determined, the payload can then be fetched (step 703) and decoded (step 704). The decoded data can then be output accordingly, e.g. for use and/or display as required.

It can be seen from the above description that the technology described herein, in its embodiments at least, provides an efficient way for extending the accessible memory address range that can be indicated within a header for an encoded block of data. Furthermore this can be done with minimal additional overhead, and without significantly modifying existing header structures. The technology described herein therefore provides various benefits compared to other approaches.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of storing an encoded block of data in memory, the method comprising:

encoding a block of data elements of an array of data elements to generate an encoded block of data that represents the block of data elements;

determining a memory location at which the encoded block of data is to be stored;

generating a header for the encoded block of data that indicates the memory location at which the encoded block of data is stored, wherein the memory location is indicated by including in the header a memory address value together with a modifier value representing a modifier that is to be applied to the memory address value when determining the memory location; and writing out the header and the encoded block of data to memory, wherein the encoded block of data is stored in memory at the location indicated in the header for the encoded block of data;

the method further comprising, when generating the header:

determining, from a plurality of available modifiers, which of the plurality of available modifiers should be used together with the memory address value for indicating the memory location at which the encoded block of data is to be stored, and including a respective modifier value representing the determined modifier in the header together with the memory address value, wherein one of the available modifiers comprises a zero modifier that does not modify the memory address value, and wherein the respective modifier value is stored using bits in the memory address field that would otherwise be usable for storing the memory address value.

2. The method of claim 1, wherein the respective modifier value represents a scale factor that is to be applied to the memory address value when determining the memory location.

3. The method of claim 1, wherein the memory address value represents an offset and wherein the respective modifier can be applied to the offset to generate a modified offset that can be used to determine the memory location.

4. The method of claim 1, comprising storing, in sequence, a plurality of encoded blocks of data in respective memory locations, wherein the encoded blocks of data are stored at progressively increasing memory locations, and wherein the method comprises initially setting the respective modifier value to a zero modifier and increasing the respective modifier value when a memory location for an encoded block of data exceeds a memory address range that can be accessed using the zero modifier.

5. The method of claim 1, wherein the encoded blocks of data are each allocated a fixed amount of space in the memory and are stored in the memory at pre-defined positions that are aligned with the respective boundaries for the allocated amounts of space.

6. The method of claim 1, further comprising when determining, from a plurality of available modifiers, which of the plurality of available modifiers should be used together with the memory address value for indicating the memory location at which the encoded block of data is to be stored:

determining whether a memory location at which the encoded block of data is to be stored would exceed a memory address range that could otherwise be accessed based on a current modifier value;

and when it is determined that the memory location at which the encoded block of data is to be stored would exceed the memory address range that could otherwise be accessed based on the current modifier value, selecting a different modifier from the plurality of modifiers such that the memory location at which the encoded block of data is to be stored can be accessed.

7. The method of claim 6, further comprising progressively increasing the modifier as the required memory address range increases.

8. The method of claim 1, wherein the modifier value is stored using bits in the memory address field that would otherwise be usable for storing the memory address value by:

truncating the memory address by removing a number of bits from the memory address, and storing the modifier in the position of the removed bits.

9. The method of claim 8, wherein a number of the least significant bits in the memory address value are truncated and the modifier is stored using these least significant bits.

10. The method of claim 1, further comprising retrieving the encoded block of data from memory, the retrieving comprising steps of:

reading from the header for the encoded block of data that represents the block of data elements of the array of data elements from memory;

determining the memory location for the encoded block of data by applying the modifier to the memory address value;

reading in data for the encoded block of data from memory from the determined memory location; and decoding the encoded block of data to derive at least one data value for a data element of the encoded block of data.

11. An apparatus for storing encoded blocks of data in memory, the apparatus comprising:

an encoding circuit configured to: encode a block of data elements of an array of data elements to generate an encoded block of data that represents the block of data elements;

a header generating circuit configured to:

determine a memory location at which the encoded block of data is to be stored; and generate a header for the encoded block of data, wherein the header indicates the memory location at which the encoded block of data is stored, wherein the memory location is indicated by the header generating circuit including in the header a memory address value together with a modifier value representing a modifier that is to be applied to the memory address value when determining the memory location; and a write out control circuit configured to write out the header and the encoded block of data to memory, wherein the encoded block of data is stored in memory at the location indicated in the header for the encoded block of data;

wherein the modifier value is stored using a number of bits in the memory address field that would otherwise be usable for storing the memory address value.

12. The apparatus of claim 11, wherein the header generating circuit is configured to determine, from a plurality of available modifiers, which of the plurality of available modifiers should be used together with the memory address value for indicating the memory location at which the encoded block of data is to be stored, and including the modifier value representing the determined modifier in the header together with the memory address value.

13. The apparatus of claim 12, wherein one of the available modifiers comprises a zero modifier that does not modifier the memory address value.

14. The apparatus of claim 13, wherein when storing, in sequence, a plurality of encoded blocks of data in respective memory locations, wherein the encoded blocks of data are stored at progressively increasing memory locations, the header-generating apparatus is configured to initially set the modifier value to a zero modifier and increase the modifier value when a memory location for an encoded block of data exceeds a memory address range that can be accessed using the zero modifier.

15. The apparatus of claim 11, wherein the encoded blocks of data are each allocated a fixed amount of space in the memory and are stored in the memory at pre-defined positions that are aligned with the respective boundaries for the allocated amounts of space.

16. The apparatus of claim 11, wherein the array of data elements corresponds to a frame generated by a graphics processing system, and wherein the memory corresponds to a frame buffer for the graphics processing system and/or for a display that the graphics processing system's output is to be provided to.

17. The apparatus of claim 11, wherein the modifier value represents a scale factor that is to be applied to the memory address value when determining the memory location.

18. The apparatus of claim 11, wherein the memory address value represents an offset and wherein the modifier can be applied to the offset to generate a modified offset that can be used to determine the memory location.

19. A method of storing an encoded block of data in memory, the method comprising:

encoding a block of data elements of an array of data elements to generate an encoded block of data that represents the block of data elements;

determining a memory location at which the encoded block of data is to be stored;

generating a header for the encoded block of data that indicates the memory location at which the encoded block of data is stored, wherein the memory location is indicated by including in the header a memory address value together with a modifier value representing a modifier that is to be applied to the memory address value when determining the memory location; and writing out the header and the encoded block of data to memory, wherein the encoded block of data is stored in memory at the location indicated in the header for the encoded block of data; wherein the modifier value is stored using bits in the memory address field that would otherwise be usable for storing the memory address value.

* * * * *

UNITED STATES PATENT AND TRADEMARK OFFICE

CERTIFICATE OF CORRECTION

PATENT NO. : 11,954,028 B2
APPLICATION NO. : 17/657498
DATED : April 9, 2024
INVENTOR(S) : Fielding et al.

It is certified that error appears in the above-identified patent and that said Letters Patent is hereby corrected as shown below:

In the Claims

Column 24, Lines 52-53 (Claim 13, Lines 2-3): please replace “not modifier” with --not modify--

Signed and Sealed this
Twentieth Day of August, 2024

Katherine Kelly Vidal

Katherine Kelly Vidal
*Director of the United States Patent and Trademark Office*